(12) United States Patent
Yang

(10) Patent No.: US 10,693,846 B2
(45) Date of Patent: Jun. 23, 2020

(54) PUBLISHED INFORMATION PROCESSING METHOD AND DEVICE, AND INFORMATION PUBLISHING SYSTEM

(71) Applicant: Alibaba Group Holding Limited, George Town (KY)

(72) Inventor: Li Yang, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/124,999

(22) Filed: Sep. 7, 2018

(65) Prior Publication Data

US 2018/0367513 A1    Dec. 20, 2018

Related U.S. Application Data

(63) Continuation of application No. PCT/CN2017/074629, filed on Feb. 23, 2017.

(30) Foreign Application Priority Data

Mar. 8, 2016    (CN) .......................... 2016 1 0130265

(51) Int. Cl.
*H04L 29/06*    (2006.01)
*H04L 9/32*    (2006.01)
(Continued)

(52) U.S. Cl.
CPC .......... *H04L 63/0428* (2013.01); *G06F 21/64* (2013.01); *H04L 9/3239* (2013.01); *H04L 29/08* (2013.01); *H04L 63/123* (2013.01)

(58) Field of Classification Search
CPC .. G06F 21/6218; G06F 21/62; G06F 21/6209; H04L 63/10; H04L 63/0281; H04L 63/101; H04L 63/1031
See application file for complete search history.

(56) References Cited

U.S. PATENT DOCUMENTS

| | | | |
|---|---|---|---|
| 8,380,710 B1* | 2/2013 | Finne ................ | G06F 16/24578 707/723 |
| 2003/0014447 A1* | 1/2003 | White ................. | G06F 17/2264 715/255 |

(Continued)

FOREIGN PATENT DOCUMENTS

| | | |
|---|---|---|
| CN | 102263827 | 11/2011 |
| CN | 102693242 | 9/2012 |

(Continued)

OTHER PUBLICATIONS

PCT International Preliminary Report on Patentability in International Application No. PCT/CN2017/074629, dated Sep. 11, 2018, 8 pages (with English translation).

(Continued)

*Primary Examiner* — Sher A Khan
(74) *Attorney, Agent, or Firm* — Fish & Richardson P.C.

(57) ABSTRACT

The present disclosure relates to a published information processing method and device. One example method includes obtaining a data item to be published in a published information record from a network site, the data item associated with a service item of the network site; determining that the published information record does not include a prior published data item associated with the service item; in response to determining that the published information record does not include a prior published data item associated with the service item, generating an encryption value based on predetermined initial information; and storing the data item and the generated encryption value in the published information record, wherein the encryption value is configured to enable a user to detect whether the data item has been modified on the network site.

15 Claims, 8 Drawing Sheets

(51) Int. Cl.
*G06F 21/64* (2013.01)
*H04L 29/08* (2006.01)

(56) References Cited

U.S. PATENT DOCUMENTS

| | | | |
|---|---|---|---|
| 2003/0105950 A1* | 6/2003 | Hirano | G06F 21/6218 713/100 |
| 2003/0126400 A1 | 7/2003 | Debiez et al. | |
| 2003/0187885 A1* | 10/2003 | Miyazaki | G06F 16/10 |
| 2006/0143462 A1* | 6/2006 | Jacobs | G06F 21/64 713/181 |
| 2007/0219942 A1 | 9/2007 | Wolff et al. | |
| 2011/0145593 A1* | 6/2011 | Auradkar | G06F 21/6218 713/189 |
| 2012/0096564 A1 | 4/2012 | Li | |
| 2012/0303968 A1 | 11/2012 | Balinsky et al. | |
| 2013/0185143 A1* | 7/2013 | Damman | G06F 16/907 705/14.41 |
| 2013/0276058 A1* | 10/2013 | Buldas | G06F 21/64 726/2 |
| 2014/0089619 A1* | 3/2014 | Khanna | G06F 16/273 711/166 |
| 2015/0063658 A1 | 3/2015 | Poder et al. | |
| 2015/0237113 A1* | 8/2015 | Liu | H04L 67/06 709/203 |
| 2016/0232143 A1* | 8/2016 | Fickenscher | G06F 16/955 |
| 2018/0367513 A1* | 12/2018 | Yang | H04L 29/08 |

FOREIGN PATENT DOCUMENTS

| | | |
|---|---|---|
| CN | 103685278 | 3/2014 |
| CN | 104158816 | 11/2014 |
| CN | 104935657 | 9/2015 |
| TW | 201220184 | 5/2012 |

OTHER PUBLICATIONS

PCT International Search Report and Written Opinion in International Application No. PCT/CN2017/074629, dated May 3, 2017, 12 pages (with English translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Extended European Search Report in European Application No. 17762453.3, dated Jun. 27, 2019, 9 pages.

International Search Report by the International Searching Authority issued in International Application No. PCT/CN2017/074629 dated May 3, 2017; 8 pages.

* cited by examiner

PUBLISHED INFORMATION PROCESSING METHOD AND DEVICE, AND INFORMATION PUBLISHING SYSTEM

CROSS-REFERENCE TO RELATED APPLICATIONS

This application is a continuation of PCT Application No. PCT/CN2017/074629, filed on Feb. 23, 2017, which claims priority to Chinese Patent Application No. 201610130265.2, filed on Mar. 8, 2016, and each application is hereby incorporated by reference in its entirety.

TECHNICAL FIELD

The present application relates to the field of data information processing technologies, and in particular, to a published information processing method and device, and an information publishing system.

BACKGROUND

With the rapid development of Internet technologies, a growing number of companies and organizations choose to display information to users on Internet platforms. For example, an online retailer can publish promotion information and merchandise sales information on the Internet; a consumer can publish a comment about a merchandise and such on the Internet; a banking organization can publish financial product sales information, bank card purchase discount information, and such to users on the Internet; and a public welfare organization can disclose donation information to users on the Internet. By using the Internet to publish information to the users, companies and organizations' operating efficiency can be improved, and the users can learn more information. However, a published information manager can be an information publisher. To be specific, the information publisher can delete or modify the published information or adjust a sequence of the published information by using a back-end server. Originality and integrity of the information published by the information publisher are very important to the users, and improved credibility of the published information makes the information publishers more trusted by the users.

In the existing technology, published information obtained by the users is mutually independent and almost not associated with each other. In this case, the information publisher can easily tamper with the published information. For example, if users make comments about low-quality after-sales services offered by a certain online retailer for a merchandise sold by the online retailer, because such a comment may affect sales of the merchandise, the online retailer can delete the comment from the back-end database through some channels. Therefore, other users will not know about the comment or identify that the comment is tampered with by the information publisher. For another example, if a company publishes an announcement on the Internet at a time later than a time at which the announcement should be published, that is, the company modifies the publishing time of the announcement in a back-end database, it is difficult for the users to provide evidence.

In the existing technology, due to lack of user supervision, the information publisher can modify or delete the published information, and consequently, originality and integrity of the information published by the information publisher cannot be ensured, and credibility of the published information is reduced. Therefore, in the existing technology, a published information processing method for improving the credibility of the publishing information is needed.

SUMMARY

Implementations of the present application are intended to provide an information publishing method and device, and an information publishing system, to increase difficulty in tampering with published information, maintain originality and integrity of a published information record, and improve credibility of the published information.

The information publishing method and device, and an information publishing system provided in the implementations of the present application are implemented as described below.

A published information processing method is provided, and the method includes the following: obtaining information to be published, and determining whether the information to be published is the first piece of published information corresponding to a publishing service item; if the determining result is yes, calculating an encryption value of predetermined initial information by using a predetermined encryption algorithm, and adding the encryption value of the predetermined initial information to the information to be published; or otherwise, calculating, by using a predetermined encryption algorithm, an encryption value of encrypted data including the last published information preceding the information to be published, and adding the encryption value of the encrypted data to the information to be published; and displaying, based on a predetermined format, the information to be published to which the encryption value is added.

A published information processing method is provided, and the method includes the following: reading, from published information, a first encryption value that is of encrypted data including the last published information preceding the published information and that is calculated by using a predetermined encryption algorithm; or when published information is the first piece of published information of a publishing service item, reading, from the published information, a first encryption value that is of predetermined initial information and that is calculated by using a predetermined encryption algorithm; calculating, based on a disclosed predetermined encryption algorithm and the last published information that precedes the published information and that includes an encryption value, a second encryption value of the last published information that includes an encryption value; determining whether the first encryption value is the same as the second encryption value; and if the determining result is no, determining that at least one piece of published information before the published information is modified.

A published information processing device is provided, and the device includes the following: a to-be-published information acquisition unit, configured to obtain information to be published, and determine whether the information to be published is the first piece of published information corresponding to a publishing service item; a predetermined data encryption value calculation unit, configured to calculate an encryption value of predetermined initial information by using a predetermined encryption algorithm, and add the encryption value of the predetermined initial information to the information to be published if the determining result of the to-be-published information acquisition unit is yes; an encryption value calculation unit, configured to calculate, by using a predetermined encryption algorithm, an encryption value of encrypted data including the last published information preceding the information to be published, and add the encryption value of the encrypted data to the information to be published if the determining result of the to-be-published information acquisition unit is no; and a to-be-published information display unit, configured to display, based on a predetermined format, the information to be published to which the encryption value is added.

A published information processing device is provided, and the device includes the following: a first encryption value acquisition unit, configured to read, from published information, a first encryption value that is of encrypted data including the last published information preceding the published information and that is calculated by using a predetermined encryption algorithm; or when published information is the first piece of published information of a publishing service item, read, from the published information, a first encryption value that is of predetermined initial information and that is calculated by using a predetermined encryption algorithm; a second encryption value calculation unit, configured to calculate, based on a disclosed predetermined encryption algorithm and the last published information that precedes the published information and that includes an encryption value, a second encryption value of the last published information that includes an encryption value; an encryption value determining unit, configured to determine whether the first encryption value is the same as the second encryption value; and a modification determining unit, configured to determine that at least one piece of published information before the published information is deleted or modified if the determining result of the encryption value determining unit is no.

An information publishing system, including an I/O interface and a processor, where the I/O interface is configured to obtain information to be published, and send processed information to be published to a specified display processing unit; and the processor is configured to determine whether the information to be published is the first piece of published information corresponding to a publishing service item; if the determining result is yes, calculate an encryption value of predetermined initial information by using a predetermined encryption algorithm, and add the encryption value of the predetermined initial information to the information to be published; or otherwise, calculate, by using a predetermined encryption algorithm, an encryption value of encrypted data including the last published information preceding the information to be published, and add the encryption value of the encrypted data to the information to be published; and generate the processed information to be published.

According to the published information processing method and device, and the information publishing system provided in the present application, an association relationship can be established between mutually independent published information, and a linked encryption system is formed in a publishing service item that includes the published information. In the linked encryption system, an information interpolator needs to modify all published information records after modifying corresponding published information, so that all the data looks flawless. This requires high costs, and can be easily identified. Therefore, according to the method and device in the implementations, difficulty in tampering with a published information record can be increased, originality and integrity of the published information record are ensured, and credibility of the published information is greatly improved. In addition, according to the published information processing method and device provided in the present application, the users can verify, by using the client terminal, whether an encryption value of the published information matches a disclosed encryption value, and then determine whether the published information record is tampered with. Therefore, according to the method and device in the implementations, a role of the users in supervising the published information records can be further enhanced, and credibility of the published information is greatly improved, and the information publisher is highly trusted by the users.

BRIEF DESCRIPTION OF DRAWINGS

To describe the technical solutions in the implementations of the present application or in the existing technology more clearly, the following briefly describes the accompanying drawings required for describing the implementations or the existing technology. Apparently, the accompanying drawings in the following description merely show some implementations recorded in the present application, and a person of ordinary skill in the art can still derive other drawings from these accompanying drawings without creative efforts.

DESCRIPTION OF IMPLEMENTATIONS

To make a person skilled in the art understand the technical solutions in the present application better, the following clearly and completely describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

Figure 1:
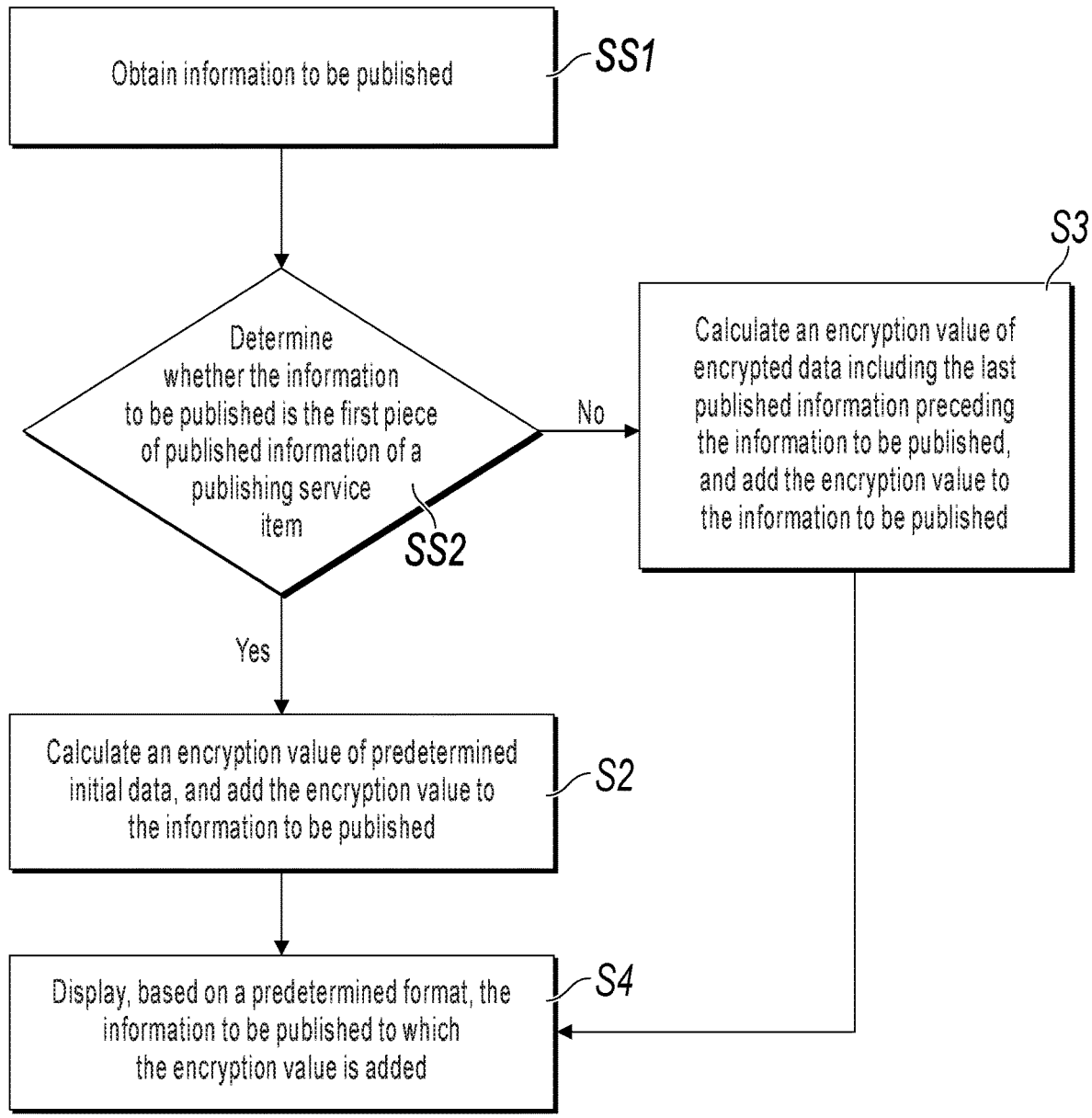
FIG. 1 is a method flowchart illustrating an implementation of a published information processing method, according to the present application.

The following describes in detail a published information processing method in the present application with reference to the accompanying drawings. FIG. 1 is a schematic method flowchart illustrating an implementation of a published information processing method, according to the present application. Although the present application provides method operation steps shown in the following implementations or accompanying drawings, the method can include more or fewer operation steps based on a conventional or non-creative effort. For steps that have no necessary logical causal relationship, an execution sequence of the steps is not limited to an execution sequence provided in the implementations of the present application. During actual published information processing or when the method is performed by a device, the method can be performed based on a method sequence shown in the implementations or the accompanying drawings, or can be performed in parallel (for example, in an environment in which there are parallel processors or multi-thread processing is performed).

An implementation of the published information processing method provided in the present application is shown in FIG. 1, and the method can include the following steps.

S1: Obtain information to be published, and determine whether the information to be published is the first piece of published information corresponding to a publishing service item.

In this implementation of the present application, the publishing service item can include a service of publishing information by a company or an organization to users, and the timeliness, authenticity, and integrity of the service usually affect interests of the users. Generally, different publishing organizations can formulate a corresponding publishing service item based on requirements of the actual publishing service. For example, a publishing service item of publishing information on an online shopping platform can include a consumer's comment about a merchandise, a piece of published information regarding extraction of some profits of a sold merchandise as a charitable donation, and such. Generally, in an implementation provided in the present application, the service item can include at least one of the following: user comment management, timely announcement information, donation information, crowdsourcing data, a payment information record, an order data record, and such.

Specifically, in this implementation, the user comment management can include a user's comment about a merchandise or a service. Authenticity and integrity of the user's comment are very helpful when other users try to evaluate quality of the merchandise or the service. The timely announcement information can include information with timeliness that is published by a company or an organization. An actual publishing time of the timely announcement information helps safeguard the interests of the users. The donation information can include records about materials donated by the users to a public welfare organization or a charity. Authenticity and integrity of the donation records can improve credibility of a public welfare activity. The crowdsourcing data can include investment data that is of the users who participate in a crowdsourcing project and that is disclosed by a fundraiser. Authenticity and integrity of the crowdsourcing data greatly help safeguard the interests of the users. The payment information record can be a payment record displayed by a payment platform to a user. Integrity of the payment information record helps the user understand an individual spending status, and such. The order data record can be a sales record of a merchandise or a service displayed by an online retailer.

An implementation process can include the following:

SS1: Obtain the information to be published. The information to be published can include information that needs to be published by the users about the service item. A large shopping platform is used as an example. On the shopping platform, both an online retailer and a consumer are users. The online retailer can publish merchandise information and a promotion announcement on the shopping platform, and the users can publish comments about a merchandise on the shopping platform. In the method in this implementation, predetermined initial information can be set as a start point of information encryption, to provide assistance in an information encryption calculation process.

After the information to be published is obtained, SS2 can be performed: determining whether the information to be published is the first piece of published information corresponding to the publishing service item. In this implementation, the first piece of published information can be the first comment published by the users in a merchandise comment publishing service item. In another implementation application scenario, the first piece of published information can be the first piece of announcement information published in a timely announcement information publishing service item. It is worthwhile to note that in a process of determining whether the information to be published is the first piece of published information corresponding to the publishing service item, whether the information to be published is the first piece of published information of the publishing service item can be determined based on a publishing time of the information to be published. Specifically, when it is identified that no other published information is published in the publishing service item before the publishing time of the information to be published, it can be determined that the information to be published is the first piece of published information.

In this implementation of the present application, the information to be published can be obtained, and then whether the information to be published is the first piece of published information corresponding to the publishing service item can be determined.

S2: If the determining result is yes, calculate an encryption value of predetermined initial information by using a predetermined encryption algorithm, and add the encryption value of the predetermined initial information to the information to be published.

If the information to be published is the first piece of published information corresponding to the service item, the encryption value of the predetermined initial information can be calculated. In this implementation, the predetermined initial information can be a character string randomly generated in a back-end database, or can be a predetermined character string. The predetermined encryption algorithm can be a hash algorithm. The hash algorithm can map a binary value with an arbitrary length to a relatively short binary value with a fixed length. The encryption value is a hash value obtained after processing is performed by using the hash algorithm. The hash value is a unique and terse value representation method of a segment of data. A different hash value is generated even if one letter in the information to be published is modified, so as to effectively ensure that encrypted data is not tampered with, and ensure originality and integrity of the encrypted data. A unique encryption value can be obtained through calculation by using the hash algorithm, and security of the encrypted data is ensured. In this implementation, encryption calculation can be performed by using a hash algorithm in the following methods as the predetermined encryption algorithm: Message Digest 2 (MD2), Message Digest 4 (MD4), Message Digest 5 (MD5), Secure Hash Algorithm 1 (SHA1), and such. Certainly, the predetermined encryption algorithm can be an encryption algorithm selected based on an encryption requirement or a data processing requirement, or can even be a user-defined encryption algorithm.

The encryption value obtained through calculation is added to the information to be published. In this case, the information to be published is updated, and the encryption value of the predetermined initial information is added to original data of the information to be published.

It is worthwhile to note that the predetermined initial information and the predetermined encryption algorithm used to calculate the encryption value can be disclosed to the users, so that the users verify originality and integrity of the published information. Certainly, the predetermined initial information can be omitted. In this case, the predetermined initial information is set to 0, and an encryption value obtained after the predetermined initial information is encrypted is still 0.

S3: Otherwise, calculate, by using a predetermined encryption algorithm, an encryption value of encrypted data including the last published information preceding the information to be published, and add the encryption value of the encrypted data to the information to be published.

If the information to be published is not the first piece of published information corresponding to the publishing service item, the encryption value of the encrypted data including the last published information preceding the information to be published can be calculated, and the encryption value of the encrypted data is added to the information to be published.

In this implementation, the encrypted data can be the last published information preceding the information to be published. Then, the last published information can be encrypted by using the predetermined encryption algorithm, to obtain encryption value of the last published information. Of course, in other implementations, the encrypted data may include the following.

In this implementation of the present application, the encrypted data can further include at least one piece of published information, which precedes the last published information, obtained by using a predetermined method.

In this implementation of the present application, the predetermined method can include at least one of the following: obtaining published information with a specified number of intervals before the information to be published; and obtaining published information within a predetermined time range before the information to be published.

The predetermined method can be a user-defined acquisition method based on an actual application scenario. For example, in some actual application scenarios, information about a certain publishing service item needs to be published relatively frequently. In this case, if an encryption value of the last published information is calculated each time information is published, operating efficiency of a back-end server is definitely affected. Specifically, in an application scenario, users can add 500 comments about a certain fast-selling merchandise each day. In the application scenario, the predetermined method can be set to calculating an encryption value once for every previous 20 comments. For example, original comments generated on the $N^{th}$ day include MSG-001, MSG-002, MSG-003, . . . , MSG-499, and MSG-500. When the $21^{st}$ comment MSG-021 is published, an encryption value of the previous 20 comments is calculated, to obtain a hash value (1-20). The hash value (1-20) and MSG-021 are published together, and the finally published $21^{th}$ comment is MSG-N021. When the $41^{st}$ comment MSG-041 is published, an encryption value of 20 comments from the $21^{st}$ comment to the $40^{th}$ comment is calculated. The $21^{st}$ comment is MSG-N021, and the $22^{nd}$ comment to the $40^{th}$ comment are MSG-022 to MSG-040. An encryption value of the $21^{st}$ comment to the $40^{th}$ comment is calculated, to obtain a hash value (21-40). The hash value (21-40) and MSG-041 are published together, and the finally published $21^{st}$ comment is MSG-N041. Certainly, in another implementation application scenario, different numbers of pieces of published information can be used for calculating the encryption value each time. For example, a time setting method can be used. The encryption value is calculated once every N hours. Specifically, an encryption value of information published in the previous N hours before the information to be published can be calculated. An encryption value of a plurality of pieces of published information preceding the information to be published is calculated, so that operation frequency of the server can be reduced, and storage space of the server or client terminal can be saved.

Figure 2:
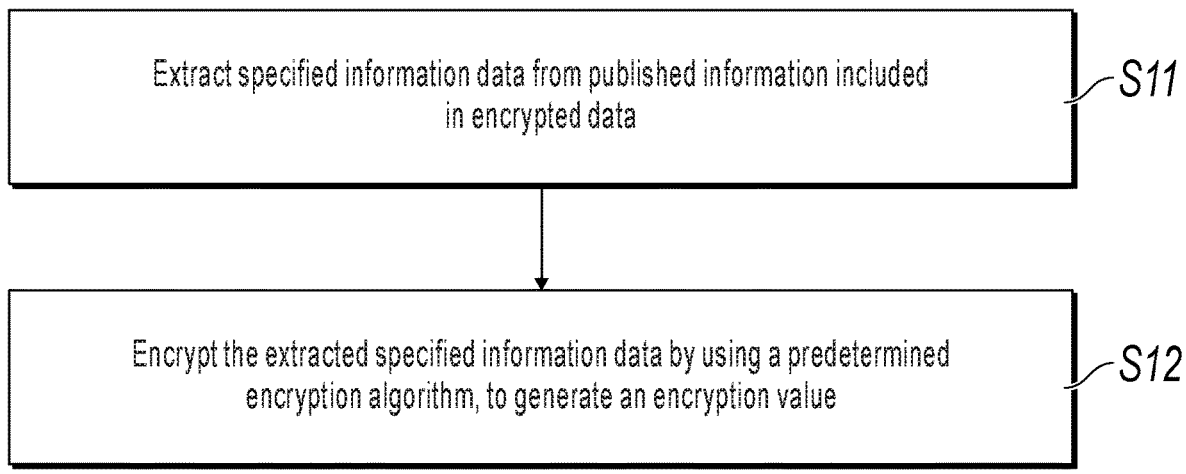
FIG. 2 is a method flowchart illustrating an implementation of an encryption value calculation method, according to the present application.

In an implementation of the present application, FIG. 2 is a method flowchart illustrating an implementation of an encryption value calculation method, according to the present application. As shown in FIG. 2, the calculating, by using a predetermined encryption algorithm, an encryption value of encrypted data including the last published information preceding the information to be published can include the following steps.

S11: Extract specified information data from published information included in the encrypted data.

Generally, all information data can be extracted from the published information included in the encrypted data, and all original data of the published information is used for encryption calculation. However, in some application scenarios, an amount of original data included in the published information is relatively large, or some of the original data changes slightly, or some of the original data has relatively small impact on the interests of the users. In this case, some information can be extracted from the original data of the published information as the specified information data. For example, in a donation information publishing service item, published information on a public welfare website usually includes data such as a name, an address, a donation amount, and a phone number of a donator. Information such as the address and the phone number of the donator has relatively small impact on authenticity of a donation activity. Therefore, in an encryption value calculation process, the data information such as the address and the phone number of the donator can be ignored, and only the name and the donation amount of the donator need to be used as the specified information data for encryption calculation.

S12: Encrypt the extracted specified information data by using the predetermined encryption algorithm, to generate the encryption value.

After the specified information data for encryption calculation is determined, the encryption value can be calculated and generated. Specifically, the extracted specified information data can be encrypted by using the predetermined encryption algorithm, to generate the encryption value. Similar to step S2, the predetermined encryption algorithm can be a hash algorithm, and correspondingly, the encryption value is a hash value obtained after processing is performed by using the hash algorithm. In this implementation, encryption calculation can be performed by using a hash algorithm in the following methods as the predetermined encryption algorithm: Message Digest 2 (MD2), Message Digest 4 (MD4), Message Digest 5 (MD5), Secure Hash Algorithm 1 (SHA1), and such.

Some data is selected from the original data included in the published information as the specified information data for encryption calculation, so that some data that has small impact on originality and authenticity of the published information can be removed, an operation amount of the server can be reduced, and storage space of the server or the client terminal can be saved.

In another implementation of the present application, the method can further include the following: obtaining additional data information, where correspondingly, the encrypted data includes the additional data information.

In the original data included in the published information, some data can have small impact on the interests of the users. However, some data that can have large impact on the interests of the users is not included in the original data. For example, timely announcement information published by some companies or organizations cannot necessarily include a time at which information is published. However, for the users, a publishing time of timely information can be used as a basis to determine whether a company or an organization delays the publishing or tampers with the publishing time. In this implementation, the additional data information can be further obtained, and the additional data information is used as a part of data for encryption calculation. In addition, the additional data information can be obtained from a file such as an operating log of the server. Specifically, in an application scenario, original timely announcement information published by the online retailer to the users includes MEG-1, MEG-2, . . . , and MEG-N. In an encryption value calculation process, time information can be added to the encrypted data. When MEG-1 is published, a hash value (MEG-0+T0), that is, predetermined initial information MEG-0 plus a predetermined initial time T0, can be calculated. The hash value (MEG-0+T0) and MEG-1 are published together, and the finally published first piece of timely announcement information is MEG-T1. When second timely announcement information MEG-2 is published, a hash value (MEG-1+T1), that is, MEG-T1 plus a publishing time T1 of MEG-T1, can be calculated. The hash value (MEG-1+T1) and MEG-2 are published together, and the finally published second timely announcement information is MEG-T2. Certainly, in another implementation, the additional data information can be information such as a code of an information publishing server, or an organization code of an information publishing unit.

Additional data information in the original data included in the published data is used as encrypted data for encryption calculation, so that uniqueness and authenticity of the encrypted data can be further enhanced, difficulty in tampering with the published information can be increased, and security of the published information can be ensured.

It is worthwhile to note that one purpose of the published information processing method provided in the present application is to allow the users to participate in supervising originality and integrity of the published information. In another implementation of the present application, subsequently, the predetermined encryption algorithm, the specified information data, or the additional data information used to generate the encryption value through calculation can be further published to the users, so that the users can verify the originality and the integrity of the published information with reference to the additional data information.

In this implementation, the encryption value of the encrypted data including the last published information preceding the information to be published is added to the information to be published, so that adjacent pieces of published information are associated with each other, and a linked encryption system is formed in the whole publishing service item. The users can identify, by using only a disclosed predetermined encryption algorithm and encrypted data for encryption calculation, whether the published information is tampered with. In the linked encryption system, an information interpolator needs to modify all published information records after modifying corresponding published information, so that all the data looks flawless. This requires high costs, and can be easily identified. Therefore, the published information processing method provided in the present application has high credibility in maintaining data originality and integrity.

S4: Display, based on a predetermined format, the information to be published to which the encryption value is added.

After the information to be published is updated, the information to be published actually includes two parts: the original data to be published, and the added encryption value of the encrypted data including the last published information preceding the information to be published. The updated information to be published can be displayed by using a plurality of methods. In an implementation of the present application, the encryption value can be directly added to an end location of the original data of the original information to be published. In another implementation of the present application, a link to the encryption value can be created in the original published information, and the users can obtain the encryption value by clicking on the link. In another implementation of the present application, a table that stores the information to be published and the encryption value added to the information to be published can be created in a display page of the service item. The users can search the table for the encryption value.

Figure 3:
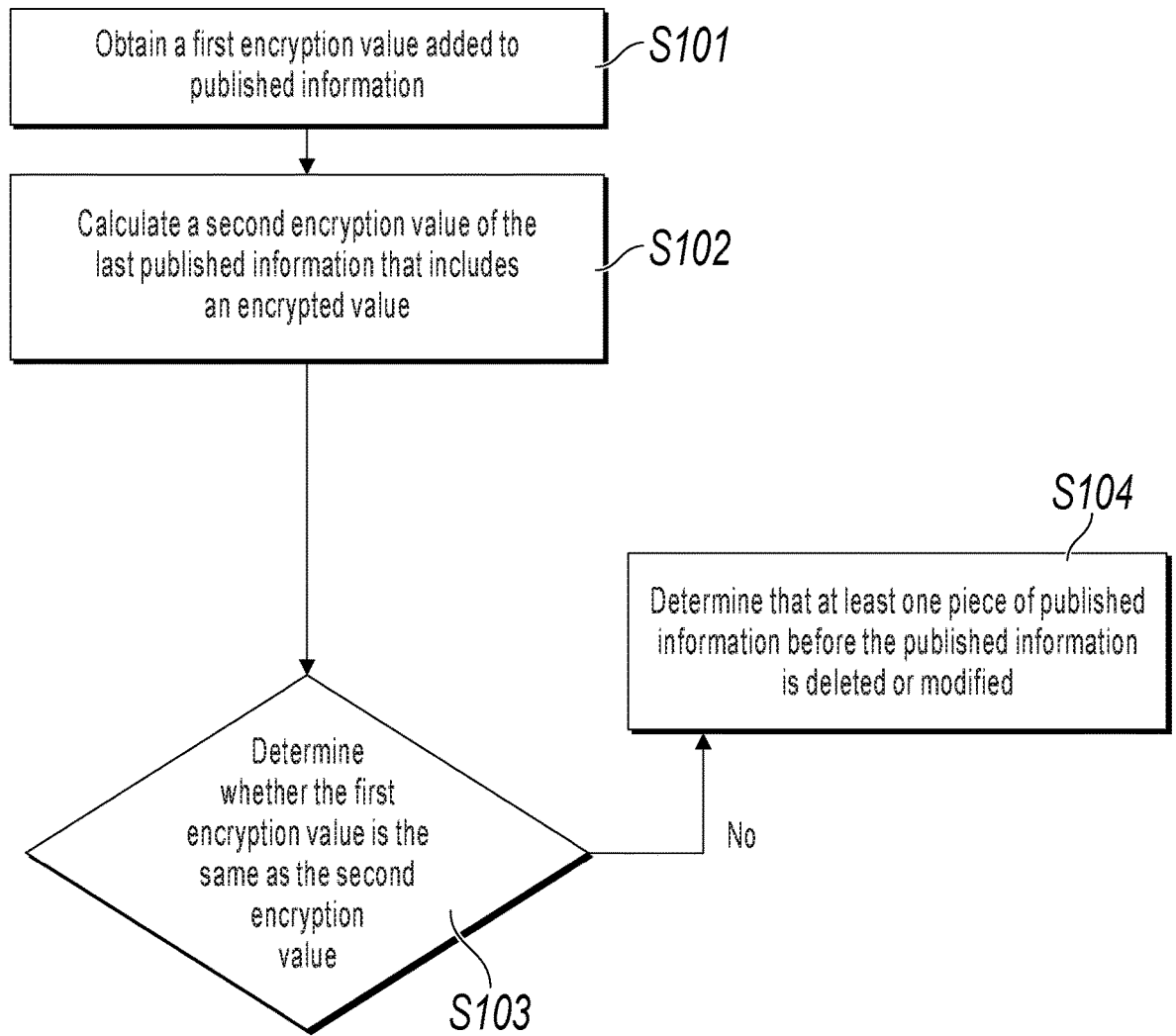
FIG. 3 is a method flowchart illustrating another implementation of a published information processing method, according to the present application.

The present application further provides an implementation of a published information processing method implemented from a perspective of client terminal. FIG. 3 is a method flowchart illustrating another implementation of a published information processing method, according to the present application. As shown in FIG. 3, the method can include the following steps.

S101: Read, from published information, a first encryption value that is of encrypted data including the last published information of the published information by using a predetermined encryption algorithm; or when published information is the first piece of published information of a publishing service item, read, from the published information, a first encryption value that is of predetermined initial information and that is calculated by using a predetermined encryption algorithm.

After obtaining the published information, the client terminal can verify whether the last published information preceding the published information is tampered with. First, the first encryption value that is of the encrypted data including the last published information preceding the published information and that is calculated by using the predetermined encryption algorithm can be read from the published information; or when the published information is the first piece of published information of the publishing service item, the first encryption value that is of the predetermined initial information and that is calculated by using the predetermined encryption algorithm can be read from the published information. The first encryption value can be directly obtained by using the display method provided in the previous S4.

S102: Calculate, based on a disclosed predetermined encryption algorithm and the last published information that precedes the published information and that includes an encryption value, a second encryption value of the last published information that includes an encryption value.

After verifying whether the last published information preceding the published information is tampered with, the client terminal can determine, through calculation, whether an actual encryption value of the last published information that precedes the published information and that includes an encryption value is the same as an encryption value included in the published information. Specifically, the client terminal can calculate, based on the disclosed predetermined encryption algorithm and the last published information that precedes the published information, that includes an encryption value and that is used to calculate an encryption value, the second encryption value of the last published information that includes an encryption value.

S103: Determine whether the first encryption value is the same as the second encryption value.

S104: If the determining result is no, determine that at least one piece of published information before the published information is deleted or modified.

When the first encryption value and the second encryption value are different, it can be determined that at least one piece of the publishing information before the published information is tampered with (deleted or modified).

According to the published information processing method provided in the present application, an association relationship can be established between mutually independent published information, and a linked encryption system is formed in a publishing service item that includes the published information. In the linked encryption system, an information interpolator needs to modify all published information records after modifying corresponding published information, so that all the data looks flawless after the published information is modified. This requires high costs, and can be easily identified. Therefore, according to the method in this implementation, difficulty in tampering with the published information record can be increased, originality and integrity of the published information record are maintained, and credibility of the published information is greatly improved. In addition, according to the published information processing method provided in the present application, the users can verify, by using the client terminal, whether the encryption value of the published information matches a disclosed encryption value, and then determine whether the published information record is tampered with. Therefore, according to the method in this implementation, a role of the users in supervising the published information records can be further enhanced, and credibility of the published information is greatly improved, and the information publisher is highly trusted by the users.

Figure 4:
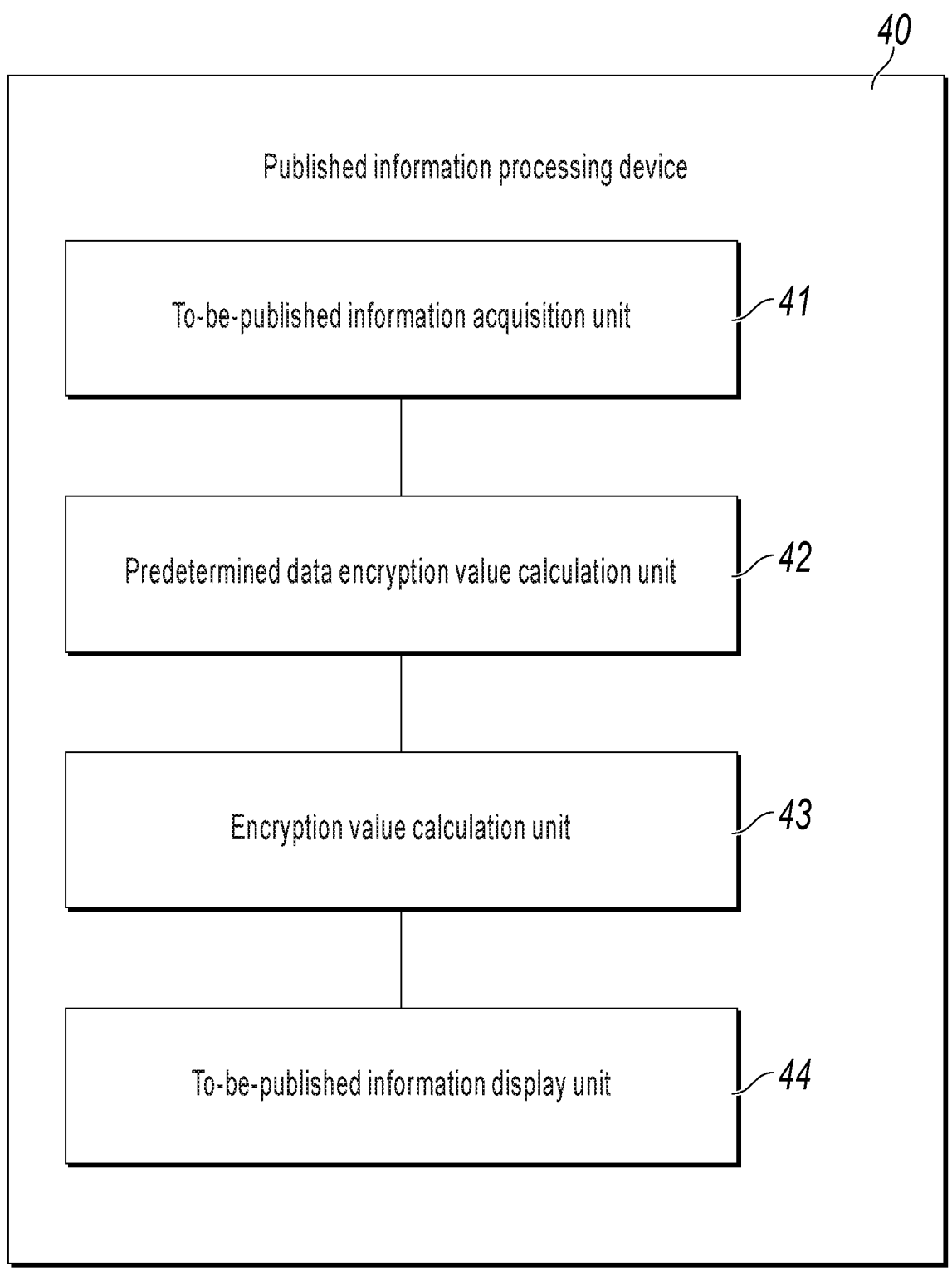
FIG. 4 is a schematic structural diagram illustrating modules in an implementation of a published information processing device, according to the present application.

Based on the published information processing method provided in the implementations of the present application, the present application further provides a published information processing device. FIG. 4 is a schematic structural diagram illustrating modules in an implementation of a published information processing device, according to the present application. As shown in FIG. 4, the device 40 can include the following: a to-be-published information acquisition unit 41, configured to obtain information to be published, and determine whether the information to be published is the first piece of published information corresponding to a publishing service item; a predetermined data encryption value calculation unit 42, configured to calculate an encryption value of predetermined initial information by using a predetermined encryption algorithm, and add the encryption value of the predetermined initial information to the information to be published if the determining result of the to-be-published information acquisition unit is yes; an encryption value calculation unit 43, configured to calculate, by using a predetermined encryption algorithm, an encryption value of encrypted data including the last published information preceding the information to be published, and add the encryption value of the encrypted data to the information to be published if the determining result of the to-be-published information acquisition unit is no; and a to-be-published information display unit 44, configured to display, based on a predetermined format, the information to be published to which the encryption value is added.

According to the published information processing device provided in the present application, an association relationship can be established between mutually independent published information, and a linked encryption system is formed in a publishing service item that includes the published information. In the linked encryption system, an information interpolator needs to modify all published information records after modifying corresponding published information, so that all the data looks flawless. This requires high costs, and can be easily identified. Therefore, according to the device in this implementation, difficulty in tampering with the published information record can be increased, originality and integrity of the published information record are ensured, and credibility of the published information is greatly improved.

In an implementation of the present application, the encrypted data can further include at least one piece of published information, which precedes the last published information, obtained by using a predetermined method.

In this implementation, the at least one piece of published information before the last published information is added to the encrypted data, so that adjacent pieces of published information are associated with each other, a linked encryption system is formed in a whole publishing service item, and security of the encryption system for the publishing service item is improved.

In an implementation, the predetermined method can be set to obtaining published information with a specified number of intervals before the information to be published or obtaining published information within a predetermined time range before the information to be published. Therefore, in another implementation of the device of the present application, the processing device can further include the following: a predetermined number information acquisition unit, configured to obtain published information with a specified number of intervals before the information to be published; and a predetermined time information acquisition unit, configured to obtain published information within a predetermined time range before the information to be published.

The published information with a specified number of intervals or the published information within a predetermined time range before the information to be published is obtained by using the predetermined number information acquisition unit or the predetermined time information acquisition unit, so that when a server calculates an encryption value of a plurality of pieces of published information preceding the information to be published, operation frequency of the server can be reduced, and storage space of the server or the client terminal can be saved.

Figure 5:
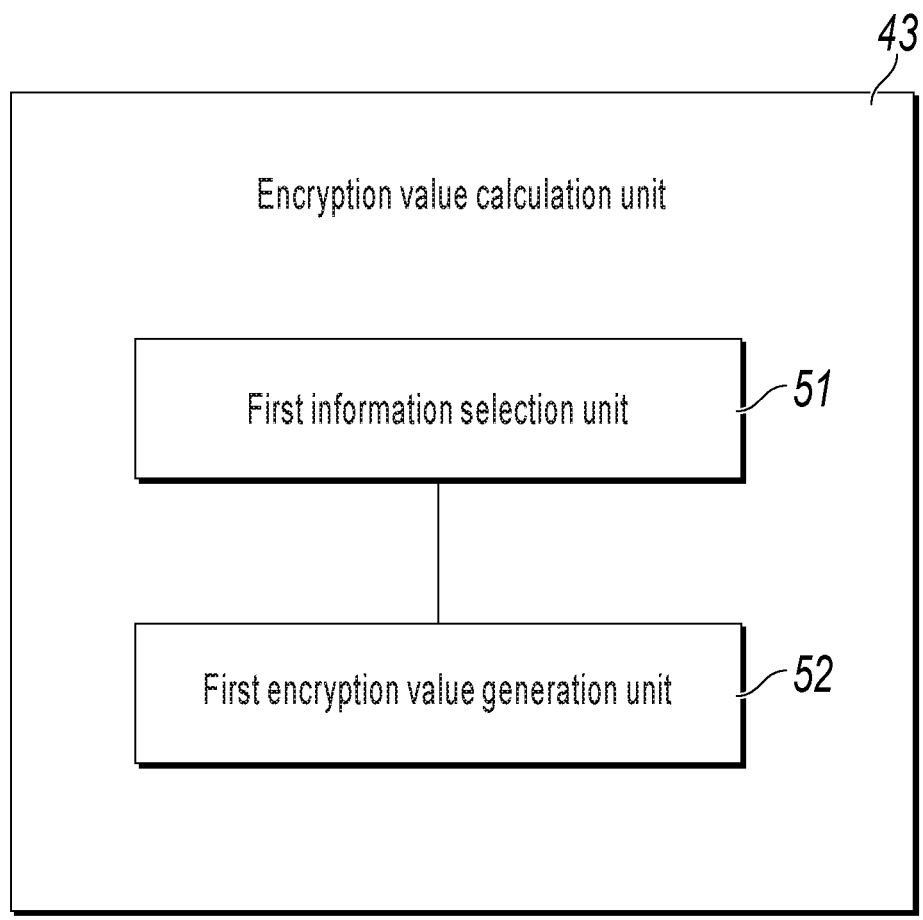
FIG. 5 is a schematic structural diagram illustrating modules in an implementation of an encryption value calculation unit, according to the present application.

FIG. 5 is a schematic structural diagram illustrating modules in an implementation of an encryption value calculation unit, according to the present application. As shown in FIG. 5, the encryption value calculation unit 43 can include the following: a first information selection unit 51, configured to extract specified information data from published information included in the encrypted data; and a first encryption value generation unit 52, configured to encrypt the extracted specified information data by using the predetermined encryption algorithm, to generate the encryption value.

Some data is selected from original data included in the published information as the specified information data for encryption calculation by using the encryption value calculation unit 43, so that some data that has small impact on originality and authenticity of the published information can be removed, the computational amount of the server can be reduced, and storage space of the server or the client terminal can be saved.

Figure 6:
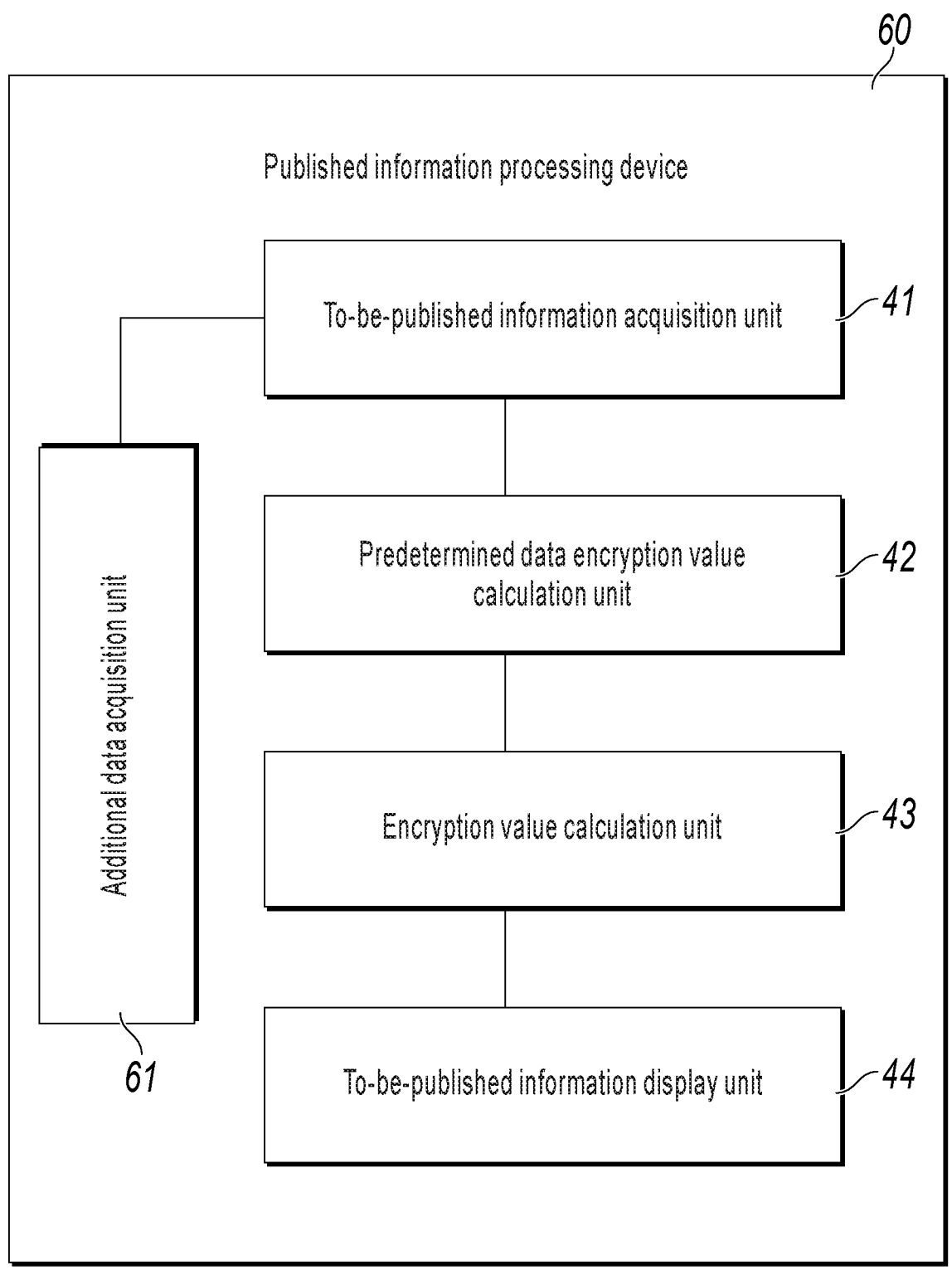
FIG. 6 is a schematic structural diagram illustrating modules in another implementation of a published information processing device, according to the present application.

FIG. 6 is a schematic structural diagram illustrating modules in another implementation of a published information processing device, according to the present application. As shown in FIG. 6, the device 60 can further include the following: an additional data acquisition unit 61, configured to obtain additional data information, where correspondingly, the encrypted data in the encryption value calculation unit 43 includes the additional data information.

Additional data information in original data included in the published data is used as encrypted data for encryption calculation by using the additional data acquisition unit 61, so that uniqueness and authenticity of the encrypted data can be further enhanced, difficulty in tampering with the published information can be increased, and security of the published information can be ensured.

In an implementation of the present application, the predetermined encryption algorithm is a hash algorithm, and the encryption value is a hash value obtained after processing is performed by using the hash algorithm. A unique encryption value can be obtained through calculation by using the hash algorithm, and security of the encrypted data is ensured. In this implementation, encryption calculation can be performed by using a hash algorithm in the following methods as the predetermined encryption algorithm: Message Digest 2 (MD2), Message Digest 4 (MD4), Message Digest 5 (MD5), Secure Hash Algorithm 1 (SHA1), and such. Certainly, the predetermined encryption algorithm can be an encryption algorithm selected based on an encryption requirement or a data processing requirement, or can even be a user-defined encryption algorithm.

In an implementation of the present application, the publishing service item can include at least one of the following: user comment management, timely announcement information, donation information, crowdsourcing data, payment information record, order data record, and such.

Figure 7:
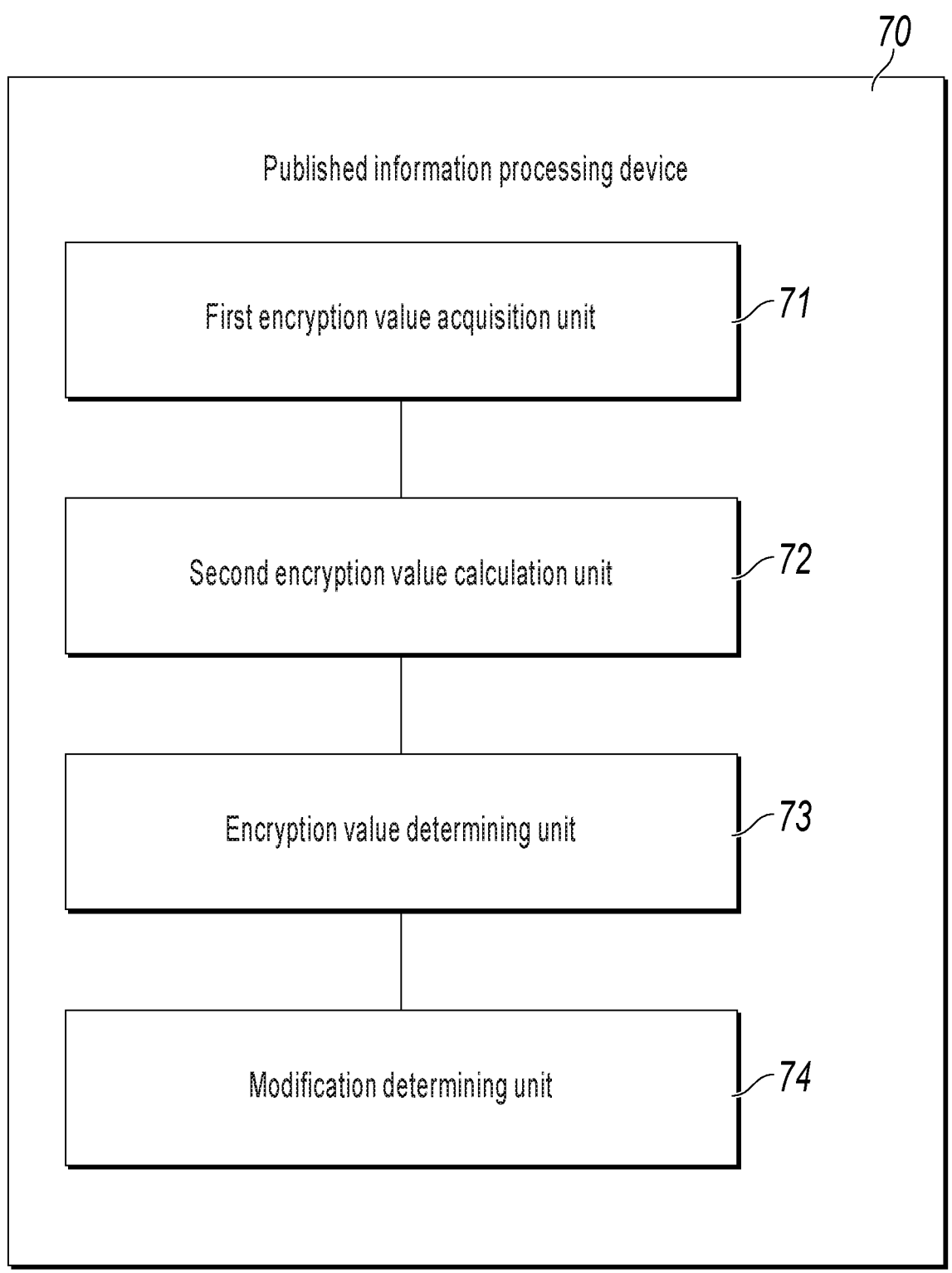
FIG. 7 is a schematic structural diagram illustrating modules in another implementation of a published information processing device, according to the present application.

Another aspect of the present application further provides a published information processing device for client terminal. FIG. 7 is a schematic structural diagram illustrating modules in another implementation of a published information processing device, according to the present application. As shown in FIG. 7, the device 70 can include the following: a first encryption value acquisition unit 71, configured to read, from published information, a first encryption value that is of encrypted data including the last published information preceding the published information and that is calculated by using a predetermined encryption algorithm; or when published information is the first piece of published information of a publishing service item, read, from the published information, a first encryption value that is of predetermined initial information and that is calculated by using a predetermined encryption algorithm; a second encryption value calculation unit 72, configured to calculate, based on a disclosed predetermined encryption algorithm and the last published information that precedes the published information and that includes an encryption value, a second encryption value of the last published information that includes an encryption value; an encryption value determining unit 73, configured to determine whether the first encryption value is the same as the second encryption value; and a modification determining unit 74, configured to determine that at least one piece of published information before the published information is deleted or modified if the determining result of the encryption value determining unit is no.

According to the published information processing device provided in the present application, the users can verify, by using the client terminal, whether the encryption value of the published information matches a disclosed encryption value, and then determine whether the published information record is tampered with. Therefore, according to the device in this implementation, a role of the users in supervising the published information records can be further enhanced, and credibility of the published information is greatly improved, and the information publisher is highly trusted by the users.

Based on the published information processing method and device, according to the implementations of the present application, the present application further provides an information publishing system, and the system can include an I/O interface and a processor.

The I/O interface is configured to obtain information to be published, and send processed information to be published to a specified display processing unit.

The processor is configured to determine whether the information to be published is the first piece of published information corresponding to a publishing service item. If the determining result is yes, calculate an encryption value of predetermined initial information by using a predetermined encryption algorithm, and add the encryption value of the predetermined initial information to the information to be published; or otherwise, calculate, by using a predetermined encryption algorithm, an encryption value of encrypted data including the last published information preceding the information to be published, and add the encryption value of the encrypted data to the information to be published; and generate the processed information to be published. In the information publishing system, an association relationship can be established between mutually independent published information, and a linked encryption system is formed in a publishing service item that includes the published information. Therefore, according to the information publishing system in this implementation, difficulty in tampering with a published information record can be increased, originality and integrity of the published information record are maintained, and credibility of the published information is greatly improved.

Although data display and processing such as different hash data encryption methods, a method for adding an encryption value to information to be published, an information data extraction method, and an information display method in the implementations are described in the present application. The present application is not limited to a data processing and display case that completely conforms to an industry standard, a certain computer language execution standard, or the descriptions in this implementation. An implementation modified based on certain standardized computer languages or implementations can also achieve an implementation effect the same as, equivalent to, or similar to that achieved in the previous implementation, or achieve a predictable implementation effect after the previous implementation is transformed. Certainly, even if the data processing and determining methods are not used, the same application can still be implemented based on data encryption, information exchange, and information determining feedback method of the previous implementations of the present application. Details are omitted here for simplicity.

Although the present application provides method operation steps described in the implementations or flowcharts, more or fewer operation steps can be included based on a conventional or non-creative means. The example step sequence in the implementations is merely one of a plurality of step execution sequences, and does not represent a unique execution sequence. When being performed in an actual device or client terminal product, the operation steps can be performed based on a method sequence shown in the implementations or the accompanying drawings, or can be performed in parallel (for example, in an environment in which there are parallel processors or multi-thread processing is performed).

The units, devices, systems, and modules described in the previous implementations can be implemented by a computer chip or an entity, or implemented by a product that has a certain function. For ease of description, the previous device is described based on division of the functions into various modules. Certainly, when the present application is implemented, the functions of each module can be implemented in one or more pieces of software and/or hardware. Certainly, a module implementing the same function as a certain unit module described in the present application can also be implemented by a plurality of submodules or a combination of submodules.

A person skilled in the art also know that, in addition to implementing the controller by using the computer readable program code, logic programming can be performed on the method steps to allow the controller to implement the same function in forms of the logic gate, the switch, an application-specific integrated circuit, a programmable logic controller, and an embedded microcontroller. Therefore, the controller can be considered as a hardware component, and a device that is included in the controller and used to implement various functions can also be considered as a structure in the hardware component. Or, the device configured to implement various functions can even be considered as both a software module implementing the method and a structure in the hardware component.

The present application can be described in the general context of computer executable instructions executed by a computer, for example, a program module. Generally, the program module includes a routine, a program, an object, a component, a data structure, a type, and such, that performs a specific task or implements a specific abstract data type. The present application can also be practiced in distributed computing environments. In the distributed computing environments, tasks are performed by remote processing devices connected with a communications network. In a distributed computing environment, the program module can be located in both local and remote computer storage media including storage devices.

It can be seen from descriptions of the implementations that, a person skilled in the art can clearly understand that the present application can be implemented by using software in addition to a necessary universal hardware platform. Based on such an understanding, the technical solutions of the present application essentially, or the part contributing to the existing technology, can be implemented in a form of a software product. The computer software product can be stored in a storage medium, such as a ROM/RAM, a magnetic disk, or an optical disc, and includes several instructions for instructing a computer device (which can be a personal computer, a mobile device, a server, a network device, and such.) to perform the methods described in the implementations or in some parts of the implementations of the present application.

The implementations in the present specification are described in a progressive method. For the same or similar parts in the implementations, reference can be made to each other. Each implementation focuses on a difference from other implementations. The present application can be used in many general-purpose or dedicated computer device environments or configurations, for example, personal computers, server computers, handheld or portable devices, tablet-type devices, multi-processor devices, microprocessor-based devices, set-top boxes, programmable electronic devices, network PCs, minicomputers, mainframe computers, distributed computing environments including any one of the previously described apparatus or devices, and such.

Although the present application is described by using implementations, a person of ordinary skill in the art knows that many modifications and variations of the present application can be made without departing from the spirit of the present application. It is expected that the claims include these modifications and variations without departing from the spirit of the present application.

Figure 8:
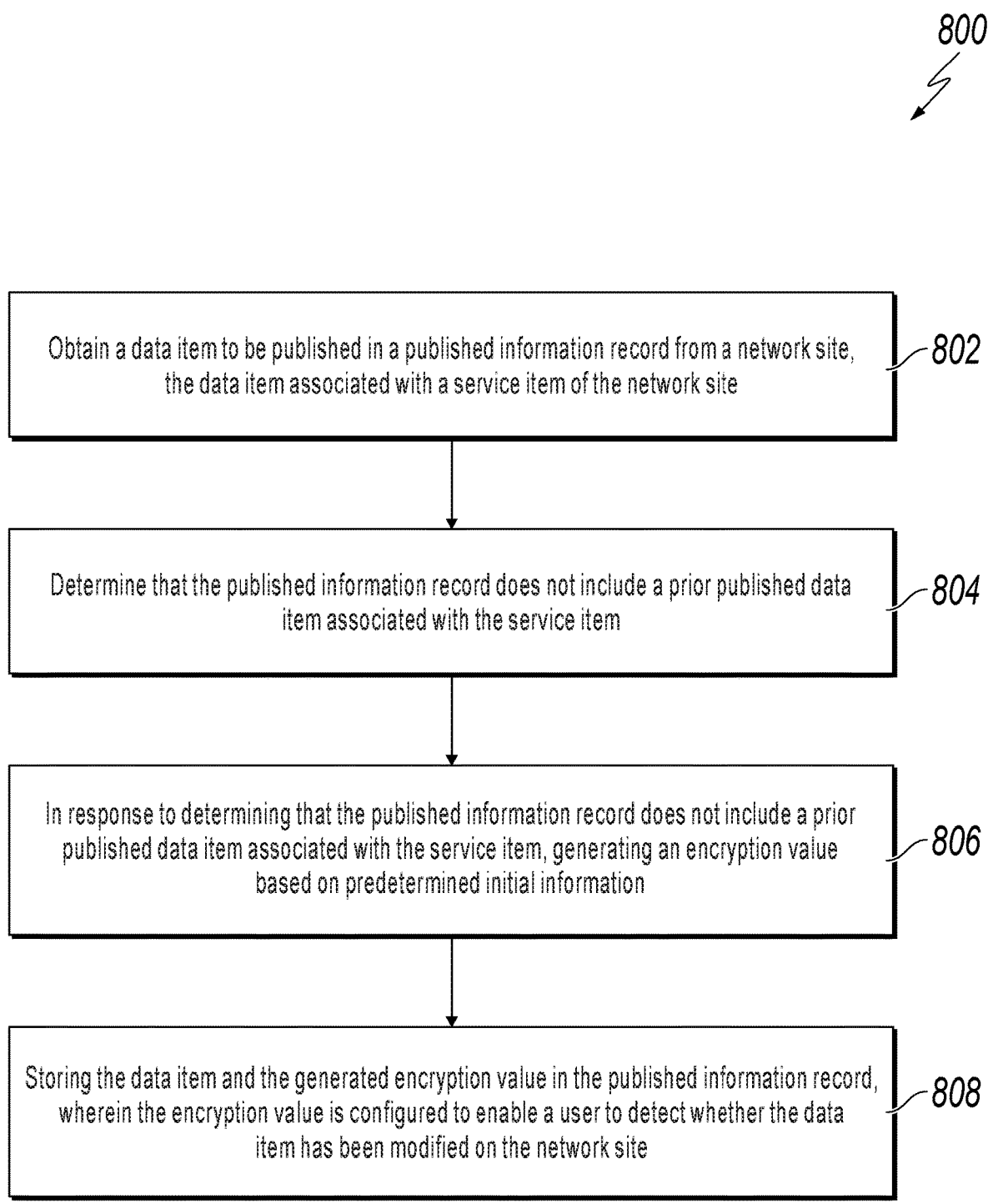
FIG. 8 is a flowchart illustrating an example of a computer-implemented method for published information processing, according to an implementation of the present disclosure.

FIG. 8 is a flowchart illustrating an example of a computer-implemented method for published information processing. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a server obtains a data item to be published in a published information record from a network site, the data item associated with a service item of the network site. For instance, the server seeks to publish information about a service item. For example, a network site, such as AMAZON, publishes service items on its shopping platform. The shopping platform may be used by both an online retailer to sell the service item and a consumer seeking to buy the original service item. For example, the service item can be a piece of clothing, a kitchen utensil, or furniture, to name a few examples. In addition, the online retailer can publish data items associated with the merchandise on the shopping platform. For example, users, such as consumers and previous consumers who bought the service item, can publish comments about the merchandise on the shopping platform. In addition, the online retailer can publish promotional announcements regarding the service item on the shopping platform. From 802, method 800 proceeds to 804.

At 804, the server determines that the published information record does not include a prior published data item associated with the service item. The server analyzes the service item, such as the piece of clothing, on the shopping platform to determine an existence of prior published information on the piece of clothing. In other examples, the prior published data item can include a user comment management, a timely announcement information, donation information, crowdsourcing data, a payment information record, or an order data record. For example, the server can analyze whether any comments exist for the piece of clothing on the shopping platform. In another example, the server can analyze whether a piece of announcement information was timely published regarding the piece of clothing on the shopping platform. In some implementations, the server can analyze a time of the latest publishing to determine if any items have been published for the service item. From 804, method 800 proceeds to 806.

At 806, in response to determining that the published information record does not include a prior published data item associated with the service item, the server generates an encryption value based on predetermined initial information. The server can identify that the information to be published will be the first piece of published information for the publishing service item. In particular, when the server determines the data item to be published will be the first data item published for the service item, the server generates an encryption value of predetermined initial information. The server can perform an encryption calculation using an encryption algorithm for hashing. For example, the hash algorithm can include one of the following Message Digest 2 (MD2), Message Digest 4 (MD4), Message Digest 5 (MD5), Secure Hash Algorithm 1 (SHA1), and others. One of the hash algorithms here can map a binary value with an arbitrary length to a relatively short binary value with a fixed length. The server obtains the encryption value or hash value after processing is performed using the hash algorithm. The hash value is a unique and terse value representation method of segmentation data.

In some implementations, the predetermined initial information can include randomly generated data for adding to the information to be published. For example, the predetermined initial information can include a character string randomly generated by a random number generator or a predetermined character string.

In some implementations, if the server determines that the published information record includes a prior published data item associated with the service item, the server generates an encryption value of data representing the prior published data item. For example, if the server determines that one or more comments (data items) associated with the service item have already been published, then the server retrieves the prior published data item (e.g., comment) that precedes the data item to be published, and generates an encryption value based on the prior published data item.

In some implementations, the server can determine an interval amount of existing publishing information to retrieve from the publishing service item. For example, the service item on the shopping platform can include 500 comments from users and other consumers. The server can retrieve from the latest published information a predetermined number or interval amount of data associated service item. For example, the server can retrieve 20 comments from the 500 comments at a time, starting with the latest comment that precedes the information to be published, and generates an encryption value of encryption data that includes the 20 comments. Thus, the server will generate 25 items of encryption data for the 500 comments. Alternatively, the server can retrieve a predetermined number of items for a particular time period, starting with the latest comment that precedes the information to be published. For example, the server can retrieve a number of comments published every hour or N hours. The particular time period can be set by a user or determined by the server based on a storage space of the server. By retrieving an interval amount of information from the service item, the processing load, and storage utilization of the can be reduced. From 806, method 800 proceeds to 808.

At 808, the server stores the data item and the generated encryption value in the published information record, wherein the encryption value is configured to enable a user to detect whether the data item has been modified on the network site. In some implementations, the server generates the encryption value to be added to the information to be published. In particular, the generated encryption value can be added to an end location of the information to be published. In another example, the server can generate a link to the encryption value to add in the information to be published, allowing the users to obtain access to the encryption value by clicking on the link. After 808, method 800 stops.

In some cases, the server publishes the data using a predetermined format. The data, which now includes the generated encryption value and the information to be published, can be published by the server for consumers over a network. In particular, the server can generate a link to the encryption value so users can obtain access to the encryption value by clicking on or selecting the link. In other implementations, the server can generate a table to post on a display page for the service items for a user's viewing. The table can include the service item as well as data for each encryption value corresponding to the information to be published for each service item. Additionally, the table can give users the ability to interact with different portions of the table to be taken to a link of the information to be published (e.g., the comments) or a link of the generated encrypted value. Users can view the data on his or her client device.

The present application describes an information publishing method and device. For example, the described information publishing method and device may perform actions including obtaining information to be published; analyzing a publishing service item to determine an existence of published information in the publishing service item; in response to determining a non-existence of the published information in the publishing service item, generating an encryption value of predetermined initial information for adding to the information to be published; generating data comprising the information to be published and the encryption value of the predetermined initial information; and, publishing the data using a predetermined format. By utilizing these techniques, difficulty in tampering with a published information record can be increased, originality and integrity of the published information record are ensured, and credibility of the published information is greatly improved. In addition, according to the published information processing method and device provided in the present application, the users can verify, by using the client terminal, whether an encryption value of the published information matches a disclosed encryption value, and then determine whether the published information record is tampered with. Therefore, according to the method and device in the implementations, a role of the users in supervising the published information records can be further enhanced, and credibility of the published information is greatly improved, and the information publisher is highly trusted by the users.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   obtaining a first data item to be published in a published information record from a network site, the first data item associated with a service item of the network site;
   determining that the published information record does not include any prior published data item associated with the service item;
   in response to determining that the published information record does not include any prior published data item associated with the service item, generating a first encryption value based on predetermined initial information; and
   storing the first data item and the generated first encryption value in the published information record, wherein the first encryption value is configured to enable a user to detect whether the first data item has been modified on the network site;
   obtaining a second data item different then the first data item to be published in the published information record from the network site, the second data item associated with the service item;
   determining that the published information record includes a prior published data item associated with the service item;
   in response to determining that the published information record includes the prior published data item associated with the service item;
   determining an interval amount of prior published data associated with the service item, wherein the interval amount of the prior published data comprises a number of data items in the prior published data, or a number of data items in a predetermined time range preceding the second data item;
   obtaining a most recent interval amount of the prior published data associated with the service item; and
   generating a second encryption value based on the most recent interval amount of the prior published data associated with the service item; and
   storing the second data item and the second encryption value in the published information record.

2. The computer-implemented method of claim 1, wherein the first data item comprises at least one of a user comment thread, announcement information, donation information, crowdsourcing information, a payment information record, or an order data record.

3. The computer-implemented method of claim 1, further comprising obtaining additional data for generating the first encryption value based on the predetermined initial information, wherein the additional data comprises instructions from an information publishing server.

4. The computer-implemented method of claim 1, wherein generating the first encryption value based on the predetermined initial information is performed using an encryption algorithm comprising at least one of a Message Digest 2 (MD2), a Message Digest 4 (MD4), a Message Digest 5 (MD5), or a Secure Hash Algorithm 1 (SHA1).

5. The computer-implemented method of claim 1, further comprising generating a link for the generated first encryption value to provide for users accessing the published information record.

6. A non-transitory, computer-readable medium storing one or more instructions executable by a computer system to perform operations comprising:
   obtaining a first data item to be published in a published information record from a network site, the first data item associated with a service item of the network site;
   determining that the published information record does not include any prior published data item associated with the service item;
   in response to determining that the published information record does not include any prior published data item associated with the service item, generating a first encryption value based on predetermined initial information; and
   storing the first data item and the generated first encryption value in the published information record, wherein the first encryption value is configured to enable a user to detect whether the first data item has been modified on the network site;
   obtaining a second data item different then the first data item to be published in the published information record from the network site, the second data item associated with the service item;
   determining that the published information record includes a prior published data item associated with the service item;
   in response to determining that the published information record includes the prior published data item associated with the service item;
   determining an interval amount of prior published data associated with the service item, wherein the interval amount of the prior published data comprises a number of data items in the prior published data, or a number of data items in a predetermined time range preceding the second data item;
   obtaining a most recent interval amount of the prior published data associated with the service item; and
   generating a second encryption value based on the most recent interval amount of the prior published data associated with the service item; and
   storing the second data item and the second encryption value in the published information record.

7. The non-transitory, computer-readable medium of claim 6, wherein the first data item comprises at least one of a user comment thread, announcement information, donation information, crowdsourcing information, a payment information record, or an order data record.

8. The non-transitory, computer-readable medium of claim 6, the operations further comprising obtaining additional data for generating the first encryption value based on the predetermined initial information, wherein the additional data comprises instructions from an information publishing server.

9. The non-transitory, computer-readable medium of claim 6, wherein generating the first encryption value based on the predetermined initial information is performed using an encryption algorithm comprising at least one of a Message Digest 2 (MD2), a Message Digest 4 (MD4), a Message Digest 5 (MD5), or a Secure Hash Algorithm 1 (SHA1).

10. The non-transitory, computer-readable medium of claim 6, the operations further comprising generating a link for the generated first encryption value to provide for users accessing the published information record.

11. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:

obtaining a first data item to be published in a published information record from a network site, the first data item associated with a service item of the network site;

determining that the published information record does not include any prior published data item associated with the service item;

in response to determining that the published information record does not include any prior published data item associated with the service item, generating a first encryption value based on predetermined initial information; and storing the first data item and the generated first encryption value in the published information record, wherein the first encryption value is configured to enable a user to detect whether the first data item has been modified on the network site;

obtaining a second data item different then the first data item to be published in the published information record from the network site, the second data item associated with the service item;

determining that the published information record includes a prior published data item associated with the service item;

in response to determining that the published information record includes a prior published data item associated with the service item;

determining an interval amount of prior published data associated with the service item, wherein the interval amount of the prior published data comprises a number of data items in the prior published data, or a number of data items in a predetermined time range preceding the second data item;

obtaining a most recent interval amount of the prior published data associated with the service item; and generating a second encryption value based on the most recent interval amount of the prior published data associated with the service item; and storing the second data item and the second encryption value in the published information record.

12. The computer-implemented system of claim 11, wherein the first data item comprises at least one of a user comment thread, announcement information, donation information, crowdsourcing information, a payment information record, or an order data record.

13. The computer-implemented system of claim 11, the operations further comprising obtaining additional data for generating the first encryption value based on the predetermined initial information, wherein the additional data comprises instructions from an information publishing server.

14. The computer-implemented system of claim 11, wherein generating the first encryption value based on the predetermined initial information is performed using an encryption algorithm comprising at least one of a Message Digest 2 (MD2), a Message Digest 4 (MD4), a Message Digest 5 (MD5), or a Secure Hash Algorithm 1 (SHA1).

15. The computer-implemented system of claim 11, the operations further comprising generating a link for the generated first encryption value to provide for users accessing the published information record.

* * * * *

UNITED STATES PATENT AND TRADEMARK OFFICE
CERTIFICATE OF CORRECTION

PATENT NO. : 10,693,846 B2
APPLICATION NO. : 16/124999
DATED : June 23, 2020
INVENTOR(S) : Li Yang Page 1 of 1

It is certified that error appears in the above-identified patent and that said Letters Patent is hereby corrected as shown below:

In the Claims

Column 21/Line 34, In Claim 1, delete "item;" and insert -- item: --, therefor.

Column 22/Line 29, In Claim 6, delete "item;" and insert -- item: --, therefor.

Column 23/Line 30 (Approx.), In Claim 11, delete "item;" and insert -- item: --, therefor.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*